United States Patent
Hopkins

(10) Patent No.: US 10,526,047 B2
(45) Date of Patent: Jan. 7, 2020

(54) WATERCRAFT WITH SHAPE CHAMBER

(71) Applicant: William Lucas Hopkins, Blacksburg, VA (US)

(72) Inventor: William Lucas Hopkins, Blacksburg, VA (US)

(*) Notice: Subject to any disclaimer, the term of this patent is extended or adjusted under 35 U.S.C. 154(b) by 0 days.

(21) Appl. No.: 15/877,797

(22) Filed: Jan. 23, 2018

(65) Prior Publication Data

US 2018/0208272 A1  Jul. 26, 2018

Related U.S. Application Data

(60) Provisional application No. 62/449,935, filed on Jan. 24, 2017.

(51) Int. Cl.
*B63B 7/00* (2006.01)
*B63B 7/08* (2006.01)
(Continued)

(52) U.S. Cl.
CPC .......... *B63B 7/08* (2013.01); *B29C 65/1403* (2013.01); *B32B 3/30* (2013.01); *B63B 35/71* (2013.01); *B63B 35/7913* (2013.01); *B29C 65/02* (2013.01); *B29C 65/04* (2013.01); *B29C 65/48* (2013.01); *B29C 65/62* (2013.01);
(Continued)

(58) Field of Classification Search
CPC .... B63B 7/00; B63B 7/06; B63B 7/08; B63B 2007/00; B63B 2007/006; B63B 2007/06; B63B 2007/065; B63B 35/71; B63B 35/79; B63B 35/7913; B63B 35/7916; B63B 2035/71; B63B 2035/79; B63B 35/7903;
(Continued)

(56) References Cited

U.S. PATENT DOCUMENTS

| | | | |
|---|---|---|---|
| 486,597 A | | 11/1892 | Gamble |
| 2,513,857 A | * | 7/1950 | Friedrich ............ B63B 35/7913 441/66 |

(Continued)

FOREIGN PATENT DOCUMENTS

| | | |
|---|---|---|
| DE | 202012008858 U1 | 10/2012 |
| DE | 202013003514 U1 | 5/2013 |

(Continued)

OTHER PUBLICATIONS

"Hala Gear Unveils New Whitewater SUP at Outdoor Retailer"; SUP Examiner; Aug. 11, 2015. https://supexaminer.com/2015/08/hala-gear-unveils-new-whitewater-sup-at-outdoor-retailer/.

(Continued)

*Primary Examiner* — Daniel V Venne
(74) *Attorney, Agent, or Firm* — New River Valley IP Law, PC; Michele L. Mayberry

(57) ABSTRACT

An additional chamber to watercraft that adds both volume and curvature to other compartments or components of the watercraft that are essentially flat is described. The additional chamber provides for modular construction of watercraft for creating volumetric space as well as a curved surface to the outer portion of the watercraft. The chamber advantageously increases the aesthetic appeal of the watercraft as well as provides a surface on which water is discouraged from pooling or collecting on. Various watercrafts having such a chamber are also described.

17 Claims, 8 Drawing Sheets

(51) Int. Cl.

| | | |
|---|---|---|
| *B63B 35/79* | (2006.01) | |
| *B63B 35/71* | (2006.01) | |
| *B32B 3/30* | (2006.01) | |
| *B29C 65/14* | (2006.01) | |
| *B63B 1/00* | (2006.01) | |
| *B63B 35/00* | (2006.01) | |
| *B29C 65/48* | (2006.01) | |
| *B29L 31/30* | (2006.01) | |
| *B29L 22/02* | (2006.01) | |
| *B29L 31/52* | (2006.01) | |
| *B29C 65/62* | (2006.01) | |
| *B29C 65/02* | (2006.01) | |
| *B29C 65/04* | (2006.01) | |

(52) U.S. Cl.
CPC ....... *B29L 2022/02* (2013.01); *B29L 2031/30* (2013.01); *B29L 2031/5272* (2013.01); *B32B 2605/00* (2013.01); *B63B 2221/02* (2013.01); *B63B 2221/10* (2013.01)

(58) Field of Classification Search
CPC ............ B63B 2221/02; B63B 2221/10; B63B 2221/14; B63B 2221/18
USPC ................................ 441/40, 66, 74; 114/345
See application file for complete search history.

(56) References Cited

U.S. PATENT DOCUMENTS

| | | | |
|---|---|---|---|
| 4,129,911 A * | 12/1978 | McDonald .......... | B63B 35/7906 441/74 |
| 4,251,893 A | 2/1981 | McCrory et al. | |
| 4,462,331 A | 7/1984 | McCrory | |
| 5,598,593 A | 2/1997 | Wolfe | |
| 6,073,291 A | 6/2000 | Davis | |
| 6,131,532 A | 10/2000 | Winner et al. | |
| 6,241,568 B1 * | 6/2001 | Simms ................. | B63B 35/7913 441/66 |
| 7,185,600 B2 * | 3/2007 | Toussi ..................... | B63B 35/71 114/345 |
| 7,406,735 B2 | 8/2008 | Lin et al. | |
| 7,662,006 B2 * | 2/2010 | Mollis ................. | B63B 35/7913 114/357 |
| 7,861,662 B2 | 1/2011 | Rista | |
| 7,992,511 B2 * | 8/2011 | Chon ....................... | B63B 7/08 114/345 |
| 8,091,502 B2 * | 1/2012 | Haller .................... | B63B 35/71 114/345 |
| 8,286,573 B2 | 10/2012 | Hoge | |
| 8,333,630 B1 * | 12/2012 | Bedford .............. | B63B 35/7906 441/74 |
| 8,591,274 B2 | 11/2013 | Haller et al. | |
| 8,800,466 B1 | 8/2014 | Shimozono et al. | |
| 8,834,220 B2 | 9/2014 | Haller et al. | |
| 8,936,500 B1 | 1/2015 | Ebrahimi | |
| 9,114,862 B2 | 8/2015 | Dingel | |
| 9,127,471 B1 | 9/2015 | Greer et al. | |
| 9,198,518 B1 | 12/2015 | Mayer | |
| 9,452,809 B2 | 9/2016 | Hoge | |
| 2003/0153221 A1 | 8/2003 | Weir | |
| 2005/0023177 A1 * | 2/2005 | Kiger .................. | B63B 35/7946 206/522 |
| 2006/0144313 A1 * | 7/2006 | Toussi ..................... | B63B 35/71 114/345 |
| 2007/0169274 A1 | 7/2007 | Boso et al. | |
| 2009/0004936 A1 * | 1/2009 | Mollis ................. | B63B 35/7913 441/66 |
| 2009/0007837 A1 * | 1/2009 | Haller .................... | B63B 7/082 114/345 |
| 2009/0031941 A1 | 2/2009 | Czamowski et al. | |
| 2009/0049757 A1 | 2/2009 | Potter | |
| 2009/0078186 A1 | 3/2009 | Rista | |
| 2011/0036284 A1 | 2/2011 | Chon | |
| 2015/0344139 A1 | 12/2015 | Coleman | |
| 2016/0200405 A1 | 7/2016 | Kim | |

FOREIGN PATENT DOCUMENTS

| | | |
|---|---|---|
| DE | 202014006268 U1 | 8/2014 |
| DE | 202013007221 U1 | 11/2014 |
| EP | 1752600 A1 | 2/2007 |
| EP | 2808245 A1 | 12/2014 |
| EP | 2852525 B1 | 4/2016 |
| GB | 427142 A | 4/1935 |
| WO | 8403868 A1 | 10/1984 |
| WO | 2009156789 A1 | 12/2009 |
| WO | 2014169386 A1 | 10/2014 |
| WO | 2016145239 A1 | 9/2016 |

OTHER PUBLICATIONS

"Hala Luya". Google Image Search. Dec. 2016. http://halagear.com/product/hala-luya-big-waterinflatable-whitewater-board/.

"Siren Supsurfing". Google Image Search. Dec. 2016. http://siren-supsurfing.com/stand-up-paddle-boards.

* cited by examiner

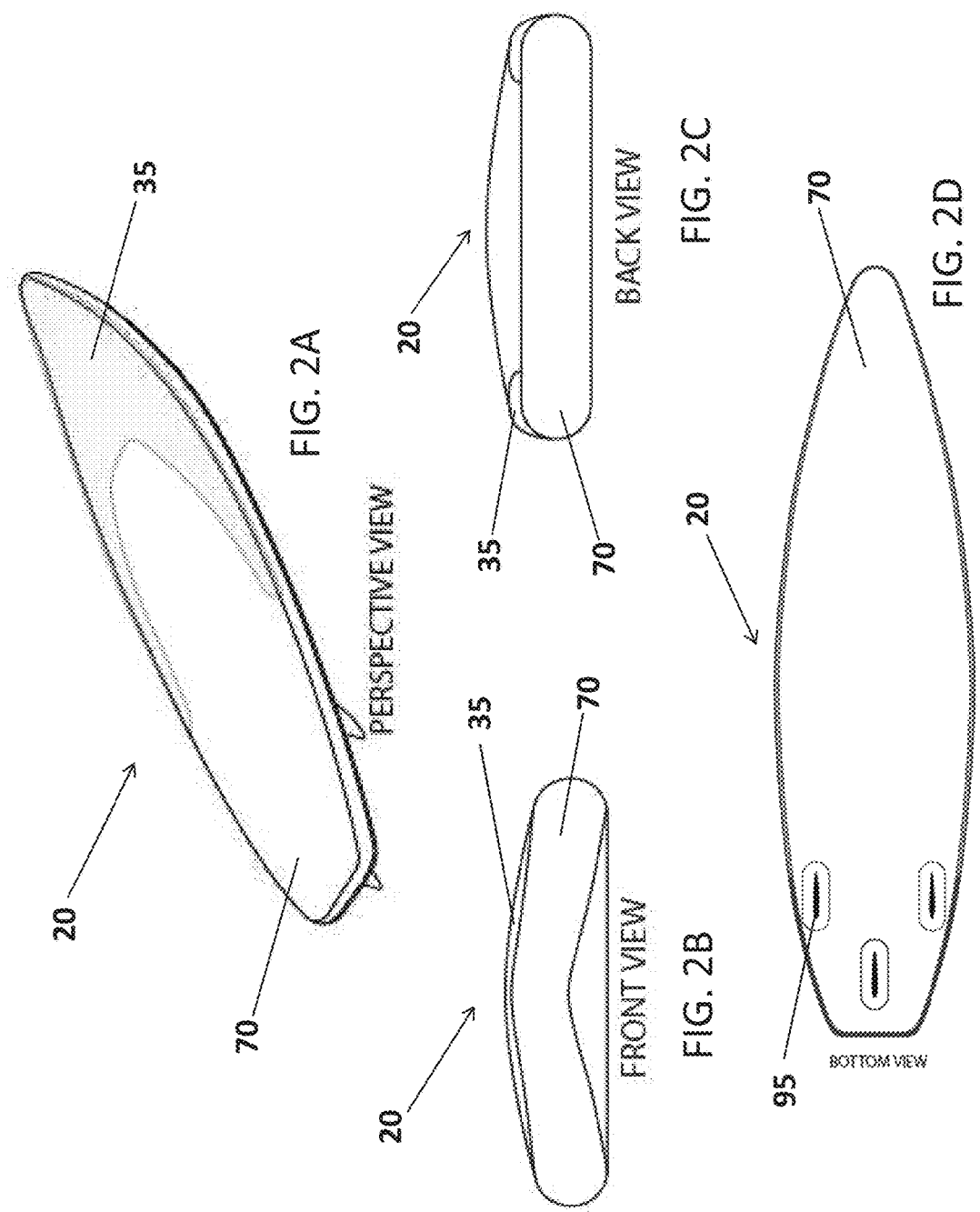

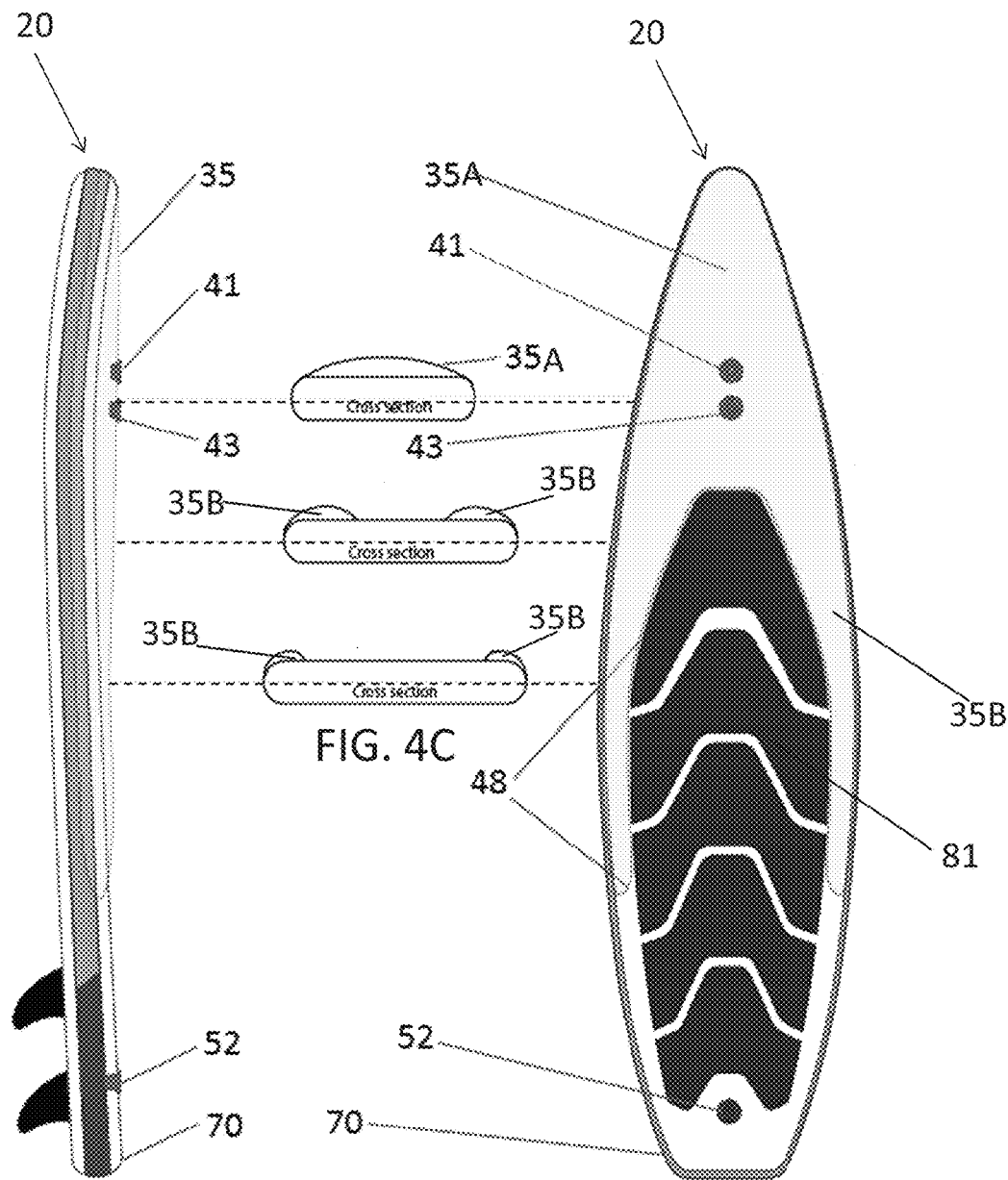

WATERCRAFT WITH SHAPE CHAMBER

CROSS-REFERENCE TO RELATED APPLICATIONS

The present application relies on the disclosure of and claims priority to and the benefit of the filing date of U.S. Provisional Application No. 62/449,935, filed Jan. 24, 2017, the disclosure of which is hereby incorporated by reference herein in its entirety.

BACKGROUND OF THE INVENTION

Field of the Invention

The present invention is directed to the field of inflatable or partially inflatable watercraft. More particularly, the present invention is directed to a watercraft having an inflatable compartment which provides additional volume and curvature to the top surface of a kayak, stand-up paddleboard, boat or similar watercraft.

Description of Related Art

Inflatable watercrafts were first developed after the commercialization of vulcanized rubber in the 1840's. However, one persistent challenge in the construction of such watercraft was the ability to create an inflatable board-like structure, including such structures as a surfboard or paddleboard. Inflation of a single compartment with gas typically will result in formation of a tubular or "hot-dog"-shaped structure, rather than the desired board shape. A solution to this problem was the creation of drop-stitched inflatable structures, which provide a series of vertical, interior stitches between two layers of fabric and thus allow for inflation of a compartment to a rigid, board-like shape. However, for some watercraft such as paddleboards, a completely flat shape to the board is less than desirable. For example, with a flat board, water can accumulate on top of the paddleboard creating inefficiencies in performance and also representing a safety hazard with instability. While there have been related efforts in this area such as those described in German Patent Nos. DE 202013003514 U1, DE 202012008858 U1, DE 202013007221 U1, DE 202014006268 U1, European Patent Application No. EP1752600A1, and U.S. Pat. Nos. 6,073,291, 6,131,532, and 486,597, there still remains an adequate solution to this problem.

SUMMARY OF THE INVENTION

In embodiments, the present invention provides an additional chamber to watercraft that adds both volume and curvature to other compartments or components of the watercraft that have less curvature or are essentially/substantially flat, either by necessity or deliberate design. The additional chamber, referred to herein as a "shape chamber", thus provides for modular construction of watercraft for creating volumetric space as well as a curved surface to the outer portion of the watercraft. The shape chamber advantageously increases the aesthetic appeal of the watercraft as well as provides a surface on which water is discouraged from pooling or collecting on.

According to embodiments, the shape chamber is an inflatable compartment that is constructed from a layer of material and bonded to a surface of the watercraft along the edge or outer perimeter of the material. Embodiments of the shape chamber may also include a deflation/inflation valve and/or a pressure relief valve. The pressure relief valve caps the interior pressure of the shape chamber so that the force of the pressure against the watercraft does not cause the shape chamber to separate from the watercraft during use from excessive heat, pressure or over inflation. According to particular embodiments, the shape chamber can be configured to add shape and volume to any portion of the watercraft.

Additional embodiments include a watercraft comprising a shape chamber described herein. The watercraft can be entirely inflatable, or composed of both inflatable and non-inflatable, or rigid, components. In an exemplary embodiment, the watercraft has a primary drop stitch inflatable chamber such as a stand-up paddleboard (SUP), and the shape chamber adds volume and curvature to portions of the SUP.

Additional embodiments of the invention are included below.

An embodiment provides an inflatable watercraft, comprising a first inflatable compartment having a first and second layer of material connected together by way of drop stitches, wherein the first layer represents a deck portion of the watercraft and the second layer represents a hull portion of the watercraft and a second inflatable compartment disposed above the first layer of the first inflatable compartment within a perimeter of the first layer such that it forms part of the deck, wherein the second inflatable compartment comprises a third layer of material which is joined to a surface of the watercraft and provides one or more convex surface to the watercraft when inflated (e.g. FIG. 1).

An embodiment provides an inflatable watercraft, comprising a first inflatable compartment comprising a first layer of material and a second layer of material connected together by way of drop stitches in a manner to provide a first surface of each of the first and second layers of material facing one another and a second surface of each of the first and second layers facing away from one another optionally, one or more additional reinforcing layers of material provided on top of the second surface of the first and/or second layers, a second inflatable compartment comprising a third layer of material attached to the first layer of material and configured to provide one or more concave surface facing the second surface of the first layer of material such that when the second compartment is inflated gas contained in the second compartment contacts the one or more concave surface of the third layer of material and contacts the second surface of the first layer of material or one of the additional reinforcing layers, if implemented, wherein the second inflatable compartment has a non-bifurcated portion disposed as the bow of the watercraft and a bifurcated portion disposed as the top port and starboard sides of the watercraft (e.g. FIG. 2A).

An embodiment provides the inflatable watercraft of any preceding embodiment, which does not comprise additional inflatable compartments (e.g. FIG. 2A).

An embodiment provides the inflatable watercraft of any preceding embodiment, wherein the third layer of material is joined directly to the first layer of the first inflatable compartment (e.g. FIG. 1).

An embodiment provides the inflatable watercraft of any preceding embodiment, further comprising one or more additional layers of material disposed on top of the first layer of material and below the third layer of material such that the third layer of material is joined directly to one of the one or more additional layers of material (e.g. FIG. 1).

An embodiment provides the inflatable watercraft of any preceding embodiment, wherein the third layer of material is joined to a surface of the watercraft by way of an adhesive, thermal bonding or welding, RF welding, zipper, or by lamination (e.g. FIG. 1).

An embodiment provides the inflatable watercraft of any preceding embodiment, wherein the third layer of material comprises the same type of material as the first and second layers of material (e.g. FIG. 1).

An embodiment provides the inflatable watercraft of any preceding embodiment, wherein the third layer of material comprises a different type of material as the first and second layers of material (e.g. FIG. 1).

An embodiment provides the inflatable watercraft of any preceding embodiment, wherein the third layer of material and/or the first layer of material and/or the second layer of material and/or the additional layer of material comprises polyvinylchloride (PVC) (e.g. FIG. 1).

An embodiment provides the inflatable watercraft of any preceding embodiment, wherein the second inflatable compartment has a non-bifurcated portion as the bow of the watercraft and a non-bifurcated portion disposed as at least a portion of the top port and starboard sides of the watercraft (e.g. FIG. 3C).

An embodiment provides the inflatable watercraft of any preceding embodiment, wherein the second inflatable compartment includes a projecting portion such that a vertical cross section along the width of the watercraft reveals that the second inflatable compartment is disposed at the center of the watercraft but not at the sides of the watercraft (e.g. FIG. 4A).

An embodiment provides the inflatable watercraft of any preceding embodiment, wherein the third layer of material is joined to the surface of the watercraft along an outer edge of the third layer of material (e.g. FIG. 4A).

An embodiment provides the inflatable watercraft of any preceding embodiment, wherein the second inflatable compartment provides a single convex surface to the watercraft when inflated (e.g. FIG. 1).

An embodiment provides the inflatable watercraft of any preceding embodiment, wherein the second inflatable compartment provides a single concave surface facing the second surface of the first layer of material when inflated (e.g. FIG. 1).

An embodiment provides the inflatable watercraft of any preceding embodiment, wherein the second inflatable compartment comprises one or more projections along the surface of the watercraft (e.g. FIG. 3C).

An embodiment provides the inflatable watercraft of any preceding embodiment, wherein the second inflatable compartment comprises a pocket capable of holding items.

An embodiment provides the inflatable watercraft of any preceding embodiment, wherein the pocket is capable of holding a cell phone.

An embodiment provides the inflatable watercraft of any preceding embodiment, wherein the pocket is disposed interior to the second inflatable compartment.

An embodiment provides the inflatable watercraft of any preceding embodiment, wherein the pocket has an opening with no closure.

An embodiment provides the inflatable watercraft of any preceding embodiment, wherein the pocket has an opening comprising a closure.

An embodiment provides the inflatable watercraft of any preceding embodiment, wherein the pocket is configured to provide a waterproof compartment.

An embodiment provides the inflatable watercraft of any preceding embodiment, wherein the third layer of material and/or the first layer of material and/or the second layer of material and/or the additional layer of material comprises natural rubber, polybutadiene, polyisoprene, polysiloxane, polyvinyl chloride, chlorosulfonated polyethylene, or polychloroprene, or any combination thereof (e.g. FIG. 1).

An embodiment provides the inflatable watercraft of any preceding embodiment, wherein the third layer of material and/or the first layer of material and/or the second layer of material and/or the additional layer of material each comprise 2, 3, 4, or 5 or more sublayers of materials.

An embodiment provides the inflatable watercraft of any preceding embodiment, wherein the second inflatable compartment comprises an inflation/deflation valve (e.g. FIG. 4B).

An embodiment provides the inflatable watercraft of any preceding embodiment, wherein the inflation/deflation valve is a Halkey Roberts valve (H-valve), a Leafield valve, a Maravia valve, a Military valve, or a Boston valve (e.g. FIG. 4B).

An embodiment provides the inflatable watercraft of any preceding embodiment, wherein the second inflatable compartment comprises a pressure relief valve (e.g. FIG. 5).

An embodiment provides the inflatable watercraft of any preceding embodiment, wherein the pressure relief valve caps the pressure of the second inflatable compartment at a pressure which is a portion of or equal to the pressure of the first inflatable compartment (e.g. FIG. 5).

An embodiment provides the inflatable watercraft of any preceding embodiment, wherein the pressure relief valve caps the pressure of the second inflatable compartment at between 10% and 100% of the pressure of the first inflatable compartment (e.g. FIG. 5).

An embodiment provides the inflatable watercraft of any preceding embodiment, wherein the pressure relief valve caps the pressure of the second inflatable compartment at between 1 psi and 20 psi (e.g. FIG. 5).

An embodiment provides the inflatable watercraft of any preceding embodiment, wherein the watercraft is a stand-up paddleboard (SUP), surfboard, windsurfer, kayak, canoe, pontoon, catamaran, raft, or boat (e.g. FIGS. 4-8).

An embodiment provides the inflatable watercraft of any preceding embodiment, wherein the outer edge of the third layer of material which is joined to the surface of the watercraft is at least 0.1 cm, 0.2 cm, 0.3 cm, 0.4 cm, 0.5 cm, 0.6 cm, 0.7 cm, 0.8 cm, 0.9 cm, 1.0 cm, 1.2 cm, 1.4 cm, 1.6 cm, 1.8 cm, or 2.0 cm or more in width (e.g. FIG. 1).

An embodiment provides the inflatable watercraft of any preceding embodiment, comprising any one or more additional features described in this disclosure (e.g. FIGS. 4 and 5).

An embodiment provides a modular watercraft comprising a first module comprising a non-inflatable, rigid component or a first inflatable compartment, wherein the first module represents any portion of the watercraft, and a second module comprising a second inflatable compartment disposed at least in part above and connected to the first module, wherein the second inflatable compartment adds more curvature to the watercraft than the first module alone (e.g. FIG. 1).

An embodiment provides the modular watercraft, wherein the watercraft is a stand-up paddleboard (e.g. FIG. 4).

An embodiment provides the modular watercraft, wherein the watercraft is a kayak (e.g. FIG. 5).

An embodiment provides the modular watercraft, further comprising one or more additional features for providing a seat (e.g. FIG. 5).

An embodiment provides the modular watercraft, wherein the one or more additional features for providing one or more of a seat include a padded kayak seat base, a seat back, a seat attachment webbing, and a seat anchor (e.g. FIG. 5).

An embodiment provides the modular watercraft, wherein the seat base is attached to the seat back and not to a hull of the kayak (e.g. FIG. 5).

An embodiment provides the modular watercraft, wherein the seat back is further attached to the seat attachment webbing (e.g. FIG. 5).

An embodiment provides the modular watercraft, wherein the seat attachment webbing is attached to the seat anchor (e.g. FIG. 5).

An embodiment provides the modular watercraft, wherein the seat anchor is a D-ring attached to the hull of the kayak (e.g. FIG. 5).

An embodiment provides the modular watercraft, wherein the second inflatable compartment has a non-bifurcated portion disposed as the bow of the watercraft and a bifurcated portion disposed as at least a portion of the top port and starboard sides of the watercraft (e.g. FIG. 2A).

An embodiment provides the modular watercraft, wherein the second inflatable compartment includes a projecting portion such that a vertical cross section along the width of the watercraft reveals that the second inflatable compartment is disposed at the center of the watercraft but not at the sides of the watercraft (e.g. FIG. 3C).

Additional embodiments and features of those embodiments will be described in further detail in the foregoing Detailed Description.

BRIEF DESCRIPTION OF THE DRAWINGS

The accompanying drawings illustrate certain features of embodiments of the present invention, and should not be used to limit the invention. Together with the written description the drawings serve to explain certain principles of the invention.

FIGS. 2A-2D are diagrams showing a perspective (FIG. 2A), front (FIG. 2B), back (FIG. 2C), and bottom (FIG. 2D) view of a paddleboard having a shape chamber according to an embodiment of the invention.

FIGS. 4A-4C are diagrams showing a side view (FIG. 4A), top view (FIG. 4B), and cross-sections (FIG. 4C) of a paddleboard having a shape chamber according to an embodiment of the invention.

DETAILED DESCRIPTION OF VARIOUS EMBODIMENTS OF THE INVENTION

Figure 1:
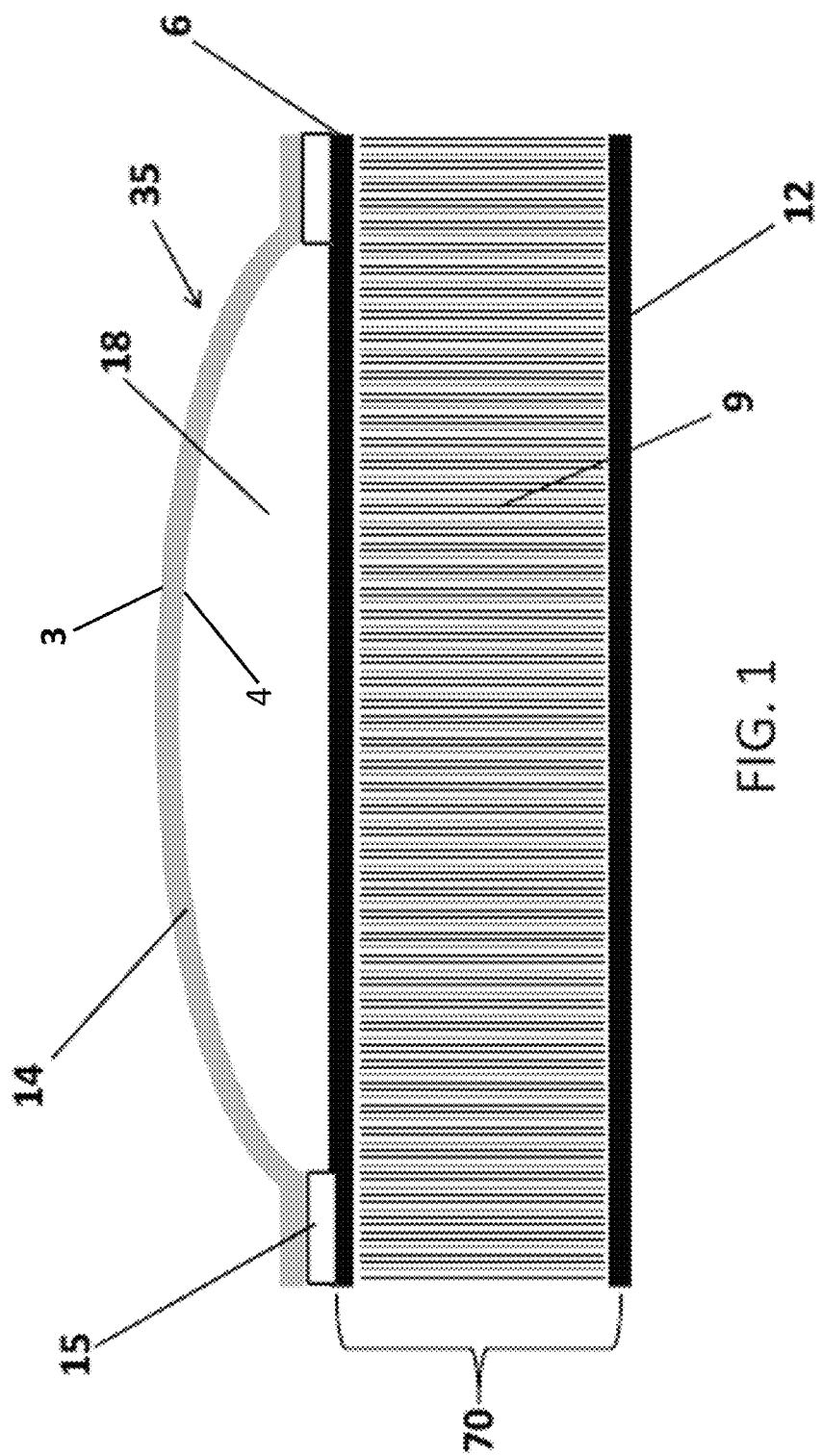
FIG. 1 is a schematic diagram showing a vertical cross-section of a modular watercraft construction with a shape chamber according to an embodiment of the invention.

Reference will now be made in detail to various exemplary embodiments of the invention. It is to be understood that the following discussion of exemplary embodiments is not intended as a limitation on the invention. Rather, the following discussion is provided to give the reader a more detailed understanding of certain features of the invention.

Embodiments of the invention provide a shape chamber for adding both volume and shape to inflatable and other types of watercraft. In embodiments, the shape chamber when inflated provides curvature which, when applied to any portion of the deck of the watercraft, has the practical effect of allowing water to roll off the watercraft during use. The shape chamber may have additional advantages, only some of which are discussed within, such as aesthetic advantages by providing a fuller or more curved appearance to the watercraft. The shape chamber can also comprise a pocket for holding items, such as a cell phone, which pocket is disposed interior to the shape chamber as a separate pocket, with or without a closure for the pocket opening. In embodiments, the pocket can be configured to provide a dry/waterproof compartment for holding items.

In one particular embodiment, the shape chamber is disposed as an additional layer of material that is bonded to a surface of another compartment or component of the watercraft, for example, along the edges of the material. The material may be any material that is both airproof and waterproof and, preferably provides for some degree of expansion when inflated. Non-limiting examples of materials that may be used to create the shape chamber include natural rubber, synthetic rubber such as polybutadiene, polyisoprene, polysiloxane, and the like, polyvinyl chloride, and other synthetic polymers, such as hypalon (chlorosulfonated polyethylene (CSPE)) or neoprene (polychloroprene). The layer of material for the shape chamber may be bonded to another surface of the watercraft at the edge with any suitable waterproof adhesive such as an epoxy, polyurethane, polyimide, cyanoacrylate, and the like. Any mechanism for attaching the material to another surface can be used, including stitching or stitching in combination with adhesive, and/or thermal bonding or welding, RF welding, lamination, a zipper, or the like. The layer of material for the shape chamber may be made of the same material as the material of the watercraft that it is bonded to, or can be made of a different material. In other embodiments, the shape chamber is composed of more than one type of material, such as additional reinforcing layers of material that are bonded over an initial layer of material. In embodiments, the layer of material for the shape chamber or the layer of material for any portion of the watercraft can comprise any number of sub-layers or plys, such as a 1-ply, or more than 1-ply, including for example 2-ply, 3-ply, 4-ply, 5-ply material, and so on.

In embodiments, the material which the shape chamber is composed of may be bonded to another layer or chamber of the watercraft at any portion of the material, such as along its edge or periphery and/or along a centerline or other interior portion of the material, for example, to create multiple shape chambers, or along an interior portion of the material to leave the edge of the material free so as to provide a ruffle or skirt. The portion of the material which is bonded may include a portion representing the outer perimeter of the material that is at least 0.1 cm in width. In other embodiments, the portion representing the outer perimeter of the material is at least 0.2 cm, 0.3 cm, 0.4 cm, 0.5 cm, 0.6 cm, 0.7 cm, 0.8 cm, 0.9 cm, 1.0 cm, 1.2 cm, 1.4 cm, 1.6 cm, 1.8 cm, 2.0 cm or more in width. Alternatively to using an adhesive, the layer of material forming the shape chamber may be connected to another layer or chamber of the watercraft by way of a drop stitch construction, or other bonding mechanism such as thermal bonding.

According to embodiments, the material which the shape chamber is composed of may be of any rectilinear or curvilinear (or combination of rectilinear and curvilinear) shape. The shape of the material may be dictated by the particular dimensions of the watercraft to which one desires to add volume and curvature. For example, in some embodiments, the shape chamber does or does not extend beyond a perimeter of another portion of the watercraft, such as the deck or hull, or the material layer of the shape chamber does or does not extend beyond a perimeter of another portion of the watercraft. For example, in the case of a paddleboard, the boundaries of the material may be determined by the overall dimensions of the board surface, as well as any areas of the surface for which the board designer desires to remain flat. Thus, in some embodiments, the surface area of the top of the shape chamber will be less than that of the top of the paddleboard itself, or the entire paddleboard itself. In other embodiments, the surface area of the shape chamber will be equal to or greater than that of the top of the paddleboard or other watercraft, or the entire paddleboard or watercraft. Additionally, in some embodiments, the shape chamber or the material of the shape chamber extends beyond the perimeter of another portion of the watercraft.

According to embodiments, the shape chamber may include an inflation/deflation valve which allows air or other gas to be pumped into the shape chamber or released. The inflation/deflation valve may be a valve which has two positions—one which allows the shape chamber to be inflated to a specific pressure when inflated, and one which allows the shape chamber to be deflated when the watercraft is not in use. Alternatively, the inflation/deflation valve may have a pin in the center which when twisted and pulled down allows for gas to escape. The inflation/deflation valve can be configured for use with standard manual or electric pumps used to inflate inflatable watercraft such as paddleboards. According to embodiments, the inflation/deflation valve may be any suitable valve used for inflatable watercraft, non-limiting examples of which include a Halkey Roberts valve (H-valve), a Leafield valve, a Maravia valve, a Military valve, and a Boston valve. The inflation/deflation valve may have an outer ring which allows it to be connected to the material of the shape chamber. According to alternative embodiments, the shape chamber has no separate inflation/deflation valve, but instead receives air from the main inflatable compartment to which it is bonded. This can be achieved by providing a passageway in the main inflatable compartment for air to escape to the shape chamber when the main inflatable compartment is inflated. Such construction eliminates the need an additional valve and for a separate inflation step to inflate the shape chamber.

Additionally, embodiments of the shape chamber may also include a pressure relief valve. An example of a pressure relief valve used on inflatable watercraft is a Leafield A6 pressure relief valve (Leafield Marine Ltd., Atworth, UK). The pressure relief valve may be configured to release gas from the inflatable watercraft at a specified pressure, either due to overinflation, heat, compression of the watercraft due to striking an object, or other causes.

In embodiments, the shape chamber, with or without the pressure relief valve is inflated to a specified pressure. The pressure is high enough so that when the shape chamber is inflated the layer of material of the shape chamber forms one or more convex surfaces on top of the material that it is attached to, yet not so high that the pressure causes it to detach from the watercraft. According to embodiments, the shape chamber is inflated to a specified pressure between 1 and 20 pounds per square inch (psi), including 1, 2, 3, 4, 5, 6, 7, 8, 9, 10, 11, 12, 13, 14, 15, 16, 17, 18, 19, and 20 psi. Alternatively, expressed as a percentage of the primary drop-stitch chamber pressure, the shape chamber may be maximally inflated to anywhere from 10% to 100% of the maximum pressure in the main drop stitch chamber of the watercraft, including 15%, 20%, 25%, 30%, 35%, 40%, 45%, 50%, 55%, 60%, 65%, 70%, 75%, 80%, 85%, 90%, or 95%. Typical pressures for a drop stitch chamber of a paddleboard are between 10-25 psi. Thus, when equipped with a pressure relief valve, the maximum inflation of the shape chamber can be capped at any of these specified pressures. The inflation/deflation valve and pressure relieve valve may be disposed at any position of the shape chamber.

Figure 6:
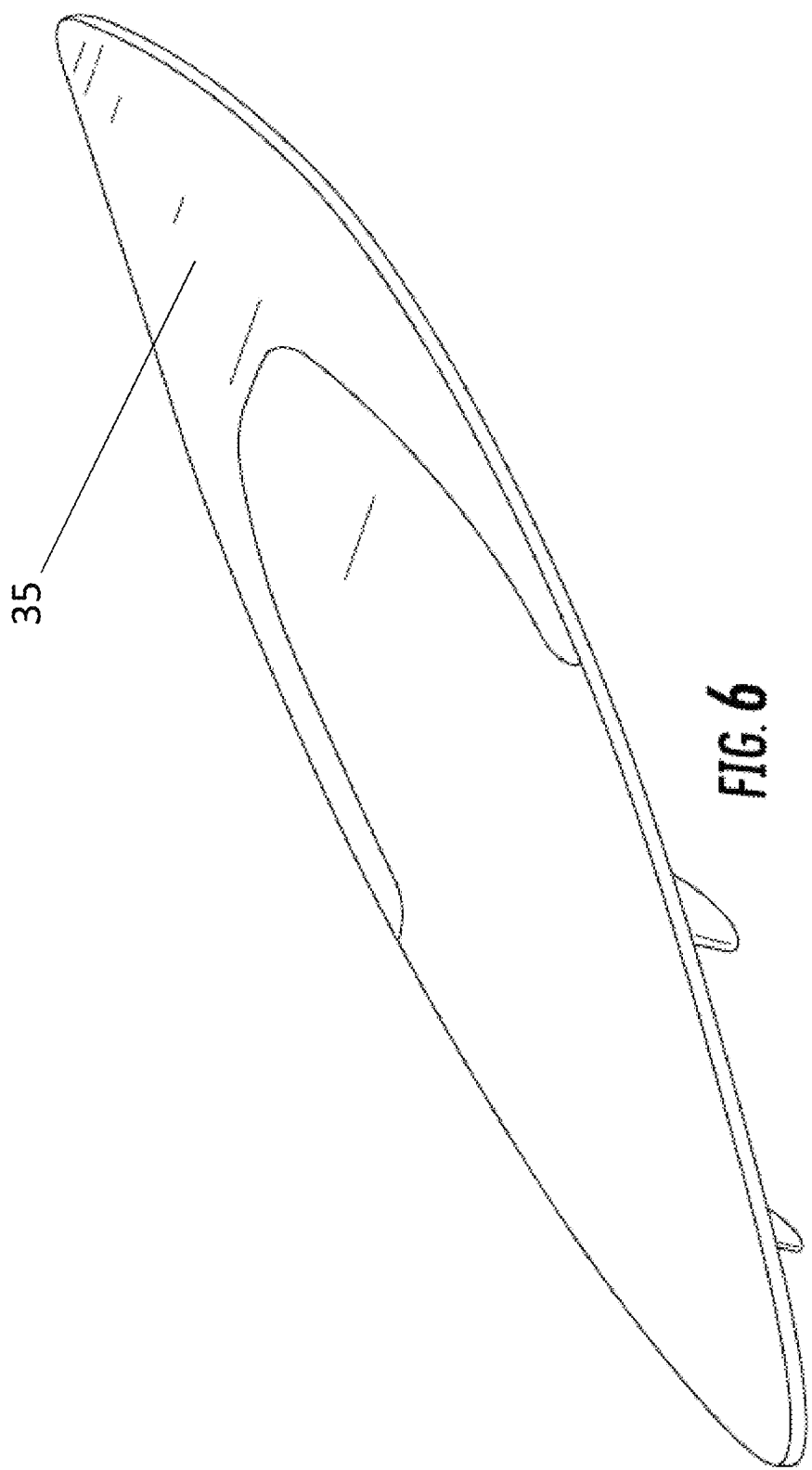
FIG. 6 is a diagram showing a surfboard having a shape chamber according to an embodiment of the invention.
Figure 7:
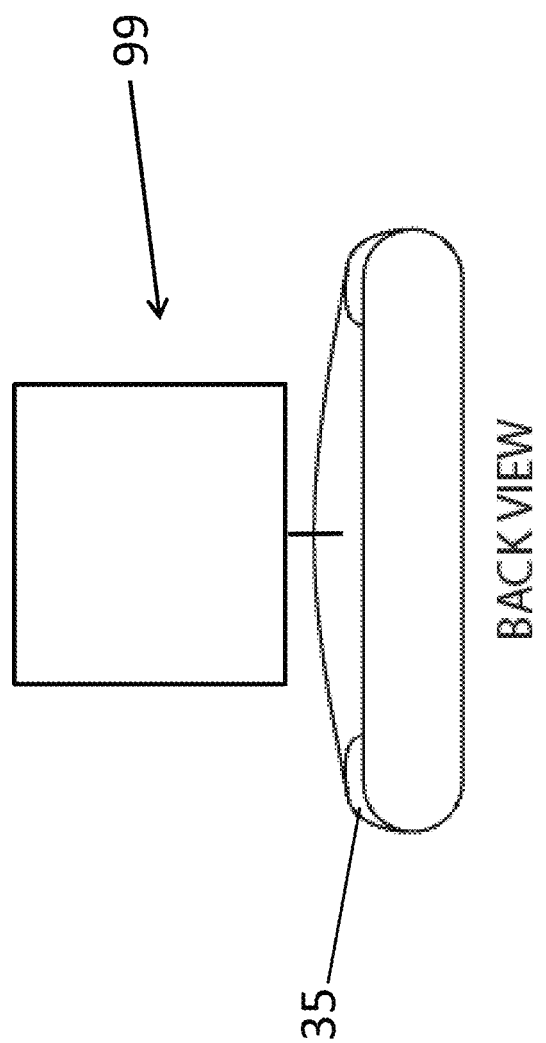
FIG. 7 is a diagram showing a windsurfer having a shape chamber according to an embodiment of the invention.
Figure 8:
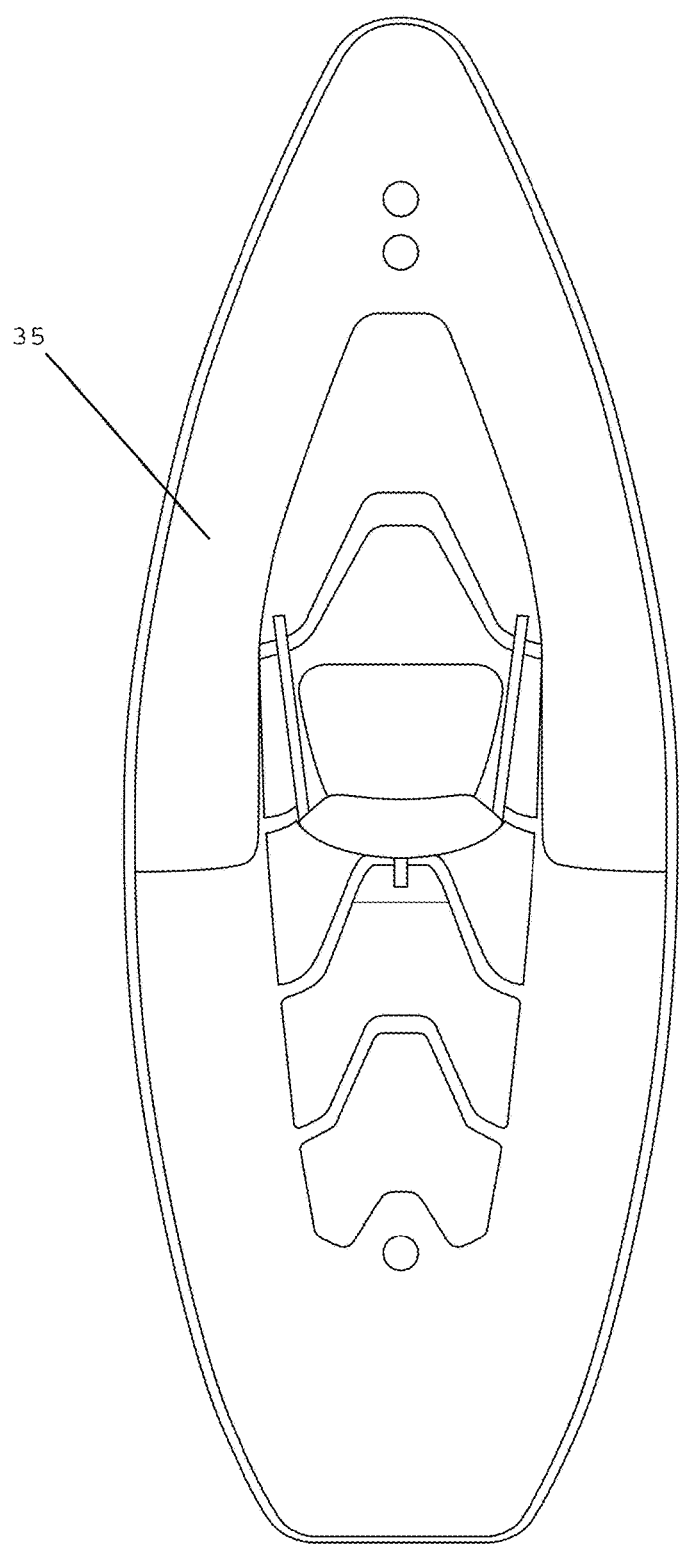
FIG. 8 is a diagram showing a boat having a shape chamber according to an embodiment of the invention.

Additional embodiments include a watercraft having a shape chamber for adding volume and curvature to the dimensions of the watercraft. The watercraft may be entirely inflatable, or partially inflatable with some of the parts non-inflatable (i.e. rigid), or non-inflatable (except for the shaping chamber). Non-limiting examples of watercraft that may include the shape chamber 35, 135 may include a stand-up paddleboard (SUP) (FIGS. 2A-4C), surfboard (FIG. 6), windsurfer (FIG. 7, which includes feature 99 which is merely a generic representation of windsurfer sail structure consistent with the specification as filed which does not show any specific geometry or spatial relationships for such structure, kayak (FIG. 5), canoe, pontoon, catamaran, raft, and boat (FIG. 8).

In watercraft embodiments, the shape chamber may be configured to provide additional volume and curvature to any portion of the watercraft, including, the bow, stern, port side, starboard side, gunwale, transom, deck, and hull, or any combination thereof. Alternatively, the shape chamber may be configured so that it is specifically omitted from any of these portions e.g. the hull. The shape chamber may be configured so that it is of unitary construction but is shaped to cover various portions of the watercraft. Alternatively, multiple shape chambers may be employed to add volume and curvature to the watercraft.

In embodiments, the shape chamber can provide additional volume and curvature to one or more or any combination of the sides, port or starboard sides, bow, stern, hull, deck, etc. For example, in one embodiment, the shape chamber provides additional volume and curvature to both sides of the watercraft, but not the bow and stern. In another embodiment, the shape chamber provides additional volume and curvature to the stern, but not the sides and bow. In another embodiment, the shape chamber provides additional volume and curvature to the bow and a portion of both sides of the watercraft. In another embodiment, the shape chamber provides additional volume and curvature to the hull of the watercraft. In another embodiment, the shape chamber provides additional volume and curvature to one or more portions of the deck, but not the hull of the watercraft. In another embodiment, the shape chamber provides additional volume and curvature to hull and the entire port and starboard sides of the watercraft. In another embodiment, the shape chamber provides additional volume and curvature to the entire deck of the watercraft, but not the hull. These are merely exemplary configurations and a skilled artisan will appreciate other designs that fall within the scope of the invention.

To create a watercraft having a shape chamber, the following procedure may be carried out. For example, in the case of a stand-up paddleboard (SUP), the paddleboard may be created by traditional drop stitch construction techniques known in the art, such that the paddleboard comprises two layers of similar dimensions joined together by interior drop stitches. Then, optionally, one or more reinforcement areas may be added to the board. Then, a sheet of polyvinylchloride (PVC), or multiple sheets, or a multi-ply sheet, may be placed on top of the board, and an outline of the overall outer edge of the shape chamber may be drawn on top of the layer of material according to where the paddleboard designer wishes to add volume and curvature. Then, the shape chamber may be cut out of the PVC along the outline by hand through use of a rotary cutter, or by way of cutting machine such as an industrial pattern cutter which are available in the sewing arts for cutting templates. Further, the cutting machine may be a Computer Numerical Controlled (CNC)-machine such as the particular dimensions of the shape material may be programmed instead of determined through outlining or tracing. Additionally openings for an inflation/deflation valve and optional pressure relief valve such as those described in this disclosure may be cut and such valves attached to the material at these openings by way of an adhesive to create an airtight seal. Finally, once the PVC is cut and valves are added, the shape chamber may be bonded to the board at its outer edge/perimeter by way of any suitable adhesive.

To use such a paddleboard, a user (i.e. SUP enthusiast) may first inflate the main drop stitch compartment to a desired pressure (e.g. 15 psi) using the main drop stitch chamber valve. Then the user proceeds to inflate the shape chamber using the separate shape chamber valve, up to its maximum tolerated pressure (e.g. 10 psi). Then, once both chambers are inflated, the SUP enthusiast can proceed to use the paddleboard like any other paddleboard.

The following figures will further illustrate various embodiments of the invention, but should not be construed to limit the invention to the particular features and arrangement of features depicted. FIG. 1 shows a vertical cross-section of an inflatable, modular watercraft construction embodiment according to the invention. A drop stitch compartment depicted as inflated (first inflatable compartment) is represented by reference numeral 70. As can be seen, the drop stitch compartment 70 is essentially/substantially flat (e.g. like a board). By essentially/substantially flat, what is meant is that, when the compartment is inflated, the surface is relatively flat and provides a surface for a user to stand on. In embodiments, the surface can be completely flat, such that the two layers of material (first layer 6 and second layer 12) that are sewn together with drop stitching are parallel, or the surface can have some curvature, for example, if the drop stitch compartment is overinflated or underinflated during use. For the sake of simplicity, two layers of material 6 and 12 are shown connected together by drop stitches 9 in between; however, the main drop stitch compartment may comprise one or more additional layers adjacent to and outside of the layers shown for reinforcement and for providing a barrier for fluids (air, water, etc.). Or the drop stitch layers can be joined together, for example, at the edges of the material or at any point on the material to provide a sealed drop stitch compartment. To add both volume and curvature to the watercraft, the shape chamber 35 is constructed by adding material 14 (third layer) on top of the drop stitch compartment 70 by bonding, for example, along the edges of the material 14 with an adhesive 15 (and/or alternative bonding, welding, and/or laminating techniques, or a zipper), and inflating the shape chamber 35 with a gas such as air to create an inflated air compartment (second inflatable compartment) 18. The shape chamber provides one or more convex surfaces 3 and one or more concave surfaces 4 to the top portion of the craft. Thus, the vertical cross-section shows that the shape chamber 35 advantageously adds both volume and curvature to the dimensions of the watercraft.

The shape chamber can add any amount of curvature to the surface of the watercraft. In calculus, a formula for measuring curvature of an arc is $$\kappa = \left\| \frac{dT}{ds} \right\|,$$

where T is the unit tangent vector and s is the arc length. The curvature measures how fast a curve is changing direction at a given point. Embodiments of the shape chamber can provide any amount of curvature above zero at any point of the shape chamber. The amount of curvature can vary along the width and/or length of the shape chamber as well.

The remainder of the figures will show various watercraft embodiments of the invention. FIGS. 2A-2D show various views of a paddleboard 20 embodiment of the invention. As shown in FIG. 2A, a perspective view of this embodiment shows that the shape chamber 35 is disposed on top of the main drop stitched air chamber 70 extending from the bow of the paddleboard 20 and bifurcating to extend to a portion of the top port and starboard sides of the paddleboard 20. FIGS. 2B and 2C show respective front and rear views of the paddleboard 20, showing that the shape chamber 35 is disposed on top of the main drop stitched air chamber 70, where the bow portion of the shape chamber 35 is shown in FIG. 2B and the port and starboard sides of the shape chamber 35 are shown in FIG. 2C. FIG. 2D shows a bottom view of the underside of the paddleboard 20, where the underside of the main dropped stitched chamber 70 includes fins 95. No shape chamber is visible in FIG. 2D as it does not extend beyond the main chamber 70 of the paddleboard, although the material used to form/provide the shape chamber can be bonded to the side(s) and/or hull of the watercraft in addition or alternatively to the top of the watercraft. In embodiments where the material of the shape chamber is bonded to the hull and/or side(s) or a portion of the hull and/or side(s), the shape chamber may be extended to portions of the sides and/or hull of the watercraft.

Figure 3A:
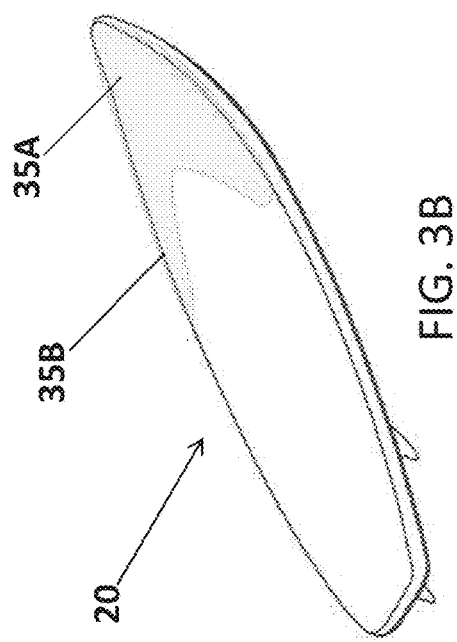
FIGS. 3A-3D are diagrams showing perspective views of various embodiments of a paddleboard with different configurations of the shape chamber according to embodiments of the invention.
Figure 3B:
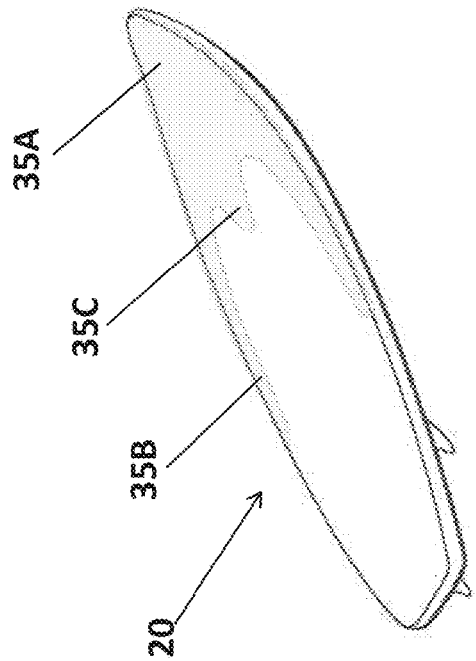
Figure 3C:
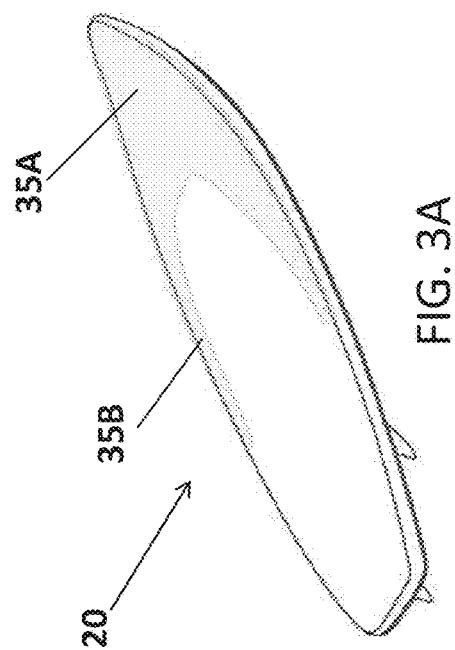
Figure 3D:
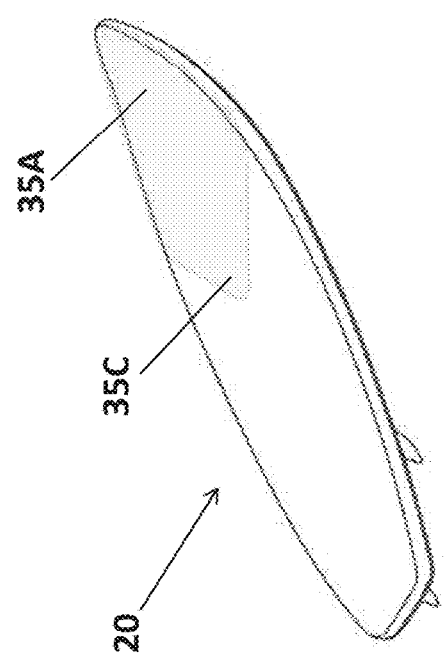

Next, FIGS. 3A-3D show perspective views of various paddleboard embodiments 20, demonstrating that various configurations of the shape chamber are possible and that the shape chamber may be comprised of particular sections. For example, FIG. 3A shows a similar configuration to FIG. 2A, with a bifurcated portion 35B and a non-bifurcated portion 35A of the shape chamber. FIG. 3B shows that the bifurcated portion 35B of the shape chamber can be truncated so that the shape chamber no longer extends as far along the port and starboard sides of the paddleboard. FIG. 3C shows a configuration where instead of a bifurcation, there is a projection 35C from the bow portion 35A toward the stern. FIG. 3D shows combined features of the previously described embodiments, in which there is a bifurcated portion 35B with a projection 35C between bifurcations. In embodiments, the shape chamber can comprise any number of projections between the bifurcations or at any portion of the shape chamber, including one, two, three, four, five, six, seven, eight, nine, or ten or more projections. However, these are merely examples, and a skilled artisan will appreciate other configuration of the shape chamber. The primary benefit of creating one or more convex surfaces on top of the paddleboard that sheds water from the paddleboard is the same.

Additional features of the paddleboard embodiment are revealed in FIGS. 4A and 4B, which show a side and top view of the paddleboard 20. The shape chamber 35 is again shown disposed on top of the main drop stitched chamber 70 in FIG. 4A, with FIG. 4B showing the non-bifurcated 35A and bifurcated 35B portions. FIG. 4B also shows the additional feature of an ethylene vinyl acetate (EVA) traction pad 81 which is glued or otherwise bonded to the deck of the paddleboard; the shape chamber is disposed at the front 35A and sides 35B of the traction pad 81 as shown with the boundary of the shape chamber shown by 48. Additionally, a pressure relief valve 41 and inflation valve 43 for the shape chamber 35 are shown. Additional features include the primary drop stitch inflation valve 52 for inflation of the primary drop stitch air chamber 70 of the paddleboard. Further, vertical cross-sections are shown by FIG. 4C at different portions of the paddleboard 20 as indicated. A cross section at the bow of the paddleboard 20, which represents the non-bifurcated portion 35A of the shape chamber is shown at the top of FIG. 4C, while the remaining cross-sections show the bifurcated portion 35B on top of the port and starboard sides of the paddleboard 20. As shown, it can be seen that the curvature of the shape chamber of this example varies in that the shape chamber when inflated provides for the most amount of curvature at the stern-most portion of the shape chamber, and for a slightly less amount of curvature at the center of the watercraft, and even slightly less curvature at the bow. Any shape configuration is possible, for example, where the shape chamber when inflated has the most curvature at the bow and gradually changes shape toward the stern-most part of the shape chamber so that the stern-most part of the shape chamber has less curvature than at the bow. In embodiments, the shape chamber can be configured to provide for the same amount of curvature along its length and/or width, or can be configured to provide a flat albeit raised surface above the main part of the watercraft such as the board. The shape chamber can also provide for varying curvature from side to side across the watercraft. For example, the shape chamber can be configured to provide for multiple convex portions when inflated.

Figure 5:
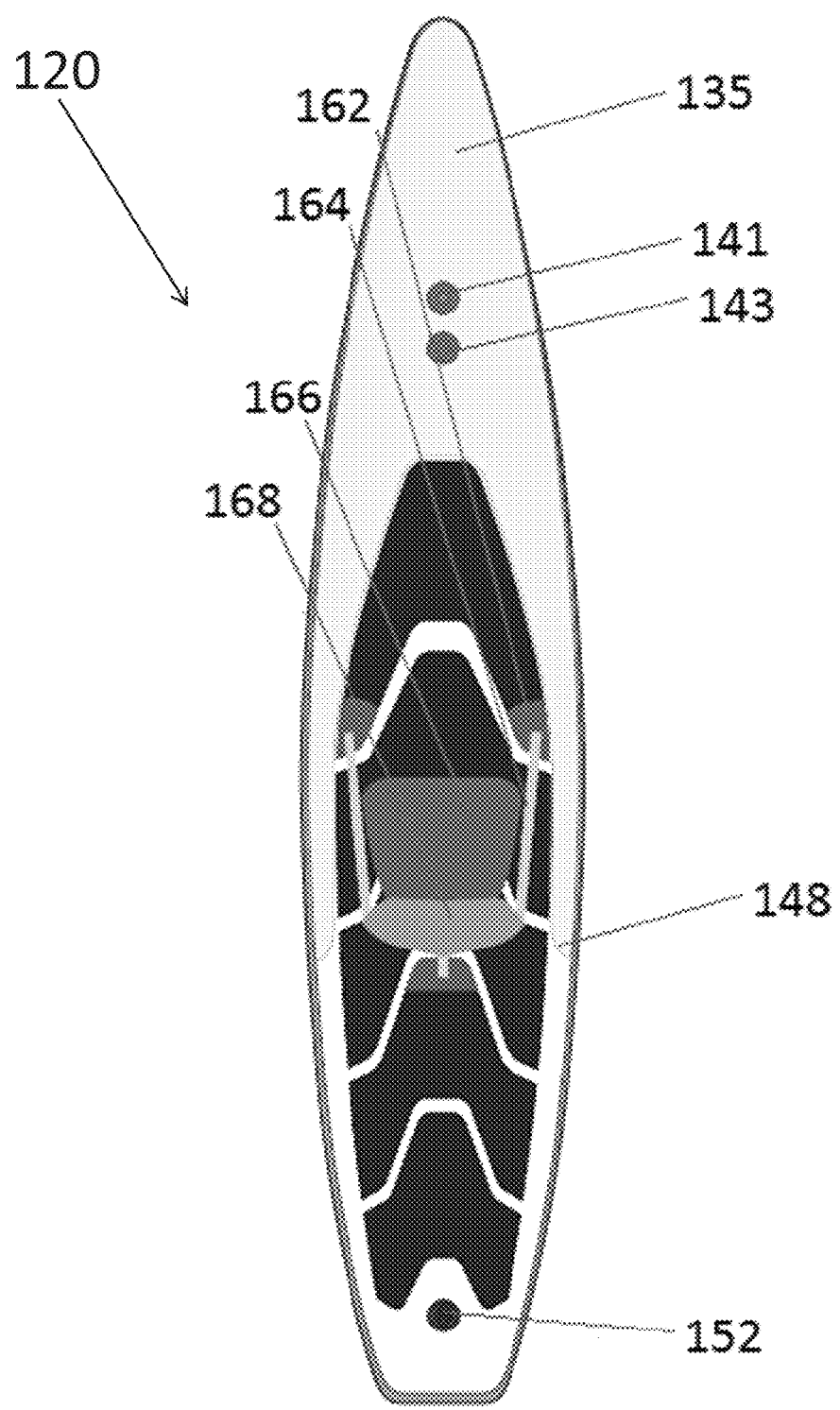
FIG. 5 is a diagram showing a kayak having a shape chamber according to an embodiment of the invention.

While the discussion thus far has been focused on paddleboard embodiments, FIG. 5 demonstrates that embodiments of the present invention is not limited to just paddleboards. FIG. 5 shows an inflatable kayak embodiment 120 having a shape chamber 135 which extends from the bow and bifurcates to the top port and starboard sides of the kayak 120. Additionally shown are features such as pressure relief valve 141 and inflation valve 143 for the shape chamber 135 as well as primary chamber valve 152. Further, the kayak embodiment has additional features for providing a seat. The padded kayak seat base 166 is attached to the seat back 168 and not to the kayak hull. The seat back 168 is also attached to the seat attachment webbing 164 which attaches the high back 168 of the seat to the mounting d-ring 162 on the surface of the kayak, which d-ring 162 functions as a seat anchor or attachment area.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. An inflatable watercraft, comprising:
a first inflatable compartment having a first and second layer of material connected together by way of drop stitches, wherein the first layer represents a deck portion of the inflatable watercraft and the second layer represents a hull portion of the inflatable watercraft; and
a second inflatable compartment disposed above the first layer of the first inflatable compartment within a perimeter of the first layer such that the second inflatable compartment forms part of the deck portion;
wherein the second inflatable compartment comprises a third layer of material which is joined to a surface of the inflatable watercraft and when inflated the second inflatable compartment provides one or more convex and concave surface of the inflatable watercraft, wherein the one or more concave surface faces the first layer of material.

2. An inflatable watercraft, comprising:
a first inflatable compartment comprising a first layer of material and a second layer of material connected together by way of drop stitches in a manner to provide a first surface of each of the first and second layers of material facing one another and a second surface of each of the first and second layers facing away from one another;
a second inflatable compartment comprising a third layer of material attached to the first layer of material and configured to provide one or more concave surface facing the second surface of the first layer of material such that when the second inflatable compartment is inflated gas contained in the second inflatable compartment directly contacts the one or more concave surface of the third layer of material and directly contacts the second surface of the first layer of material;
wherein the second inflatable compartment has a non-bifurcated portion disposed as a bow of the watercraft and a bifurcated portion disposed as a top port side and a top starboard side of the watercraft.

3. The inflatable watercraft of claim 1, which does not comprise additional inflatable compartments.

4. The inflatable watercraft of claim 1, wherein the third layer of material is joined directly to the first layer of the first inflatable compartment.

5. The inflatable watercraft of claim 1, further comprising one or more additional layers of material disposed on top of the first layer of material and below the third layer of material such that the third layer of material is joined directly to one of the one or more additional layers of material.

6. The inflatable watercraft of claim 1, wherein the first inflatable compartment and second inflatable compartment are joined by way of an adhesive, thermal bonding or welding, RF welding, zipper, or by lamination.

7. The inflatable watercraft of claim 1, wherein the third layer of material comprises a same type of material as the first and second layers of material.

8. The inflatable watercraft of claim 1, wherein the third layer of material comprises a different type of material as the first and second layers of material.

9. The inflatable watercraft of claim 1, wherein the second inflatable compartment has a non-bifurcated portion as a bow of the watercraft and a non-bifurcated portion disposed as at least a portion of a top port side and a top starboard side of the watercraft.

10. The inflatable watercraft of claim 1, wherein the second inflatable compartment includes a projecting portion such that a vertical cross section along a width of the watercraft reveals that the second inflatable compartment is disposed at a center of the watercraft but not at a side of the watercraft.

11. The inflatable watercraft of claim 1, wherein the third layer of material is joined to a surface of the watercraft along an outer edge of the third layer of material.

12. The inflatable watercraft of claim 1, wherein the second inflatable compartment provides a single convex surface to the watercraft when inflated.

13. The inflatable watercraft of claim 1, wherein the second inflatable compartment comprises one or more projections along a surface of the watercraft.

14. The inflatable watercraft of claim 1, wherein one or more of the third layer of material, the first layer of material, and the second layer of material comprises multiple layers of materials.

15. The inflatable watercraft of claim 1, wherein the second inflatable compartment comprises an inflation/deflation valve.

16. The inflatable watercraft of claim 1, wherein the second inflatable compartment comprises a pressure relief valve.

17. The inflatable watercraft of claim 1, wherein the watercraft is a stand-up paddleboard (SUP), surfboard, windsurfer, kayak, canoe, pontoon, catamaran, raft, or boat.

* * * * *